(12) United States Patent
Vettorel

(10) Patent No.: US 10,098,496 B2
(45) Date of Patent: Oct. 16, 2018

(54) REGULATION METHOD FOR THE FINENESS OF A COFFEE GRINDER

(71) Applicant: GLOBAL COFFEE SERVICE F.V., Schoffengrund-Laufdorf (DE)

(72) Inventor: Fabio Vettorel, Schoffengrund-Laufdorf (DE)

(73) Assignee: GLOBAL COFFEE SERVICE F.V., Schoffengrund-Laufdorf (DE)

( * ) Notice: Subject to any disclaimer, the term of this patent is extended or adjusted under 35 U.S.C. 154(b) by 313 days.

(21) Appl. No.: 14/993,109

(22) Filed: Jan. 12, 2016

(65) Prior Publication Data
US 2016/0199851 A1    Jul. 14, 2016

(30) Foreign Application Priority Data

Jan. 12, 2015    (IT) .............................. TV2015A0003

(51) Int. Cl.
*A47J 31/42*    (2006.01)
*A47J 31/44*    (2006.01)
*B02C 25/00*    (2006.01)
*G05B 15/02*    (2006.01)

(52) U.S. Cl.
CPC ........... *A47J 31/42* (2013.01); *A47J 31/4403* (2013.01); *B02C 25/00* (2013.01); *G05B 15/02* (2013.01)

(58) Field of Classification Search
None
See application file for complete search history.

(56) References Cited

U.S. PATENT DOCUMENTS

| 2010/0198413 A1* | 8/2010 | De' Longhi ............ A47J 31/42 700/275 |
| 2011/0283888 A1* | 11/2011 | Pozzari .................. A47J 31/42 99/285 |
| 2014/0076167 A1 | 3/2014 | Boggavarapu |
| 2017/0335988 A1* | 11/2017 | Peret .................... G06K 9/2027 |

FOREIGN PATENT DOCUMENTS

WO    WO2013/121438 A1    8/2013

* cited by examiner

*Primary Examiner* — Whitney T Moore
(74) *Attorney, Agent, or Firm* — Mark M. Friedman

(57) ABSTRACT

To improve the particle size regulation produced by a coffee grinder (64) associated with an espresso coffee dispensing machine (10), a method is described comprising the steps of acquiring, via a sensor (42), a data or an electrical signal indicative of the shape of the thread of liquid coffee (C) while it percolates from the outlet (14) of the machine, driving an operator of the grinder to regulate the particle size thereof as a function of the detected signal or data.

21 Claims, 1 Drawing Sheet

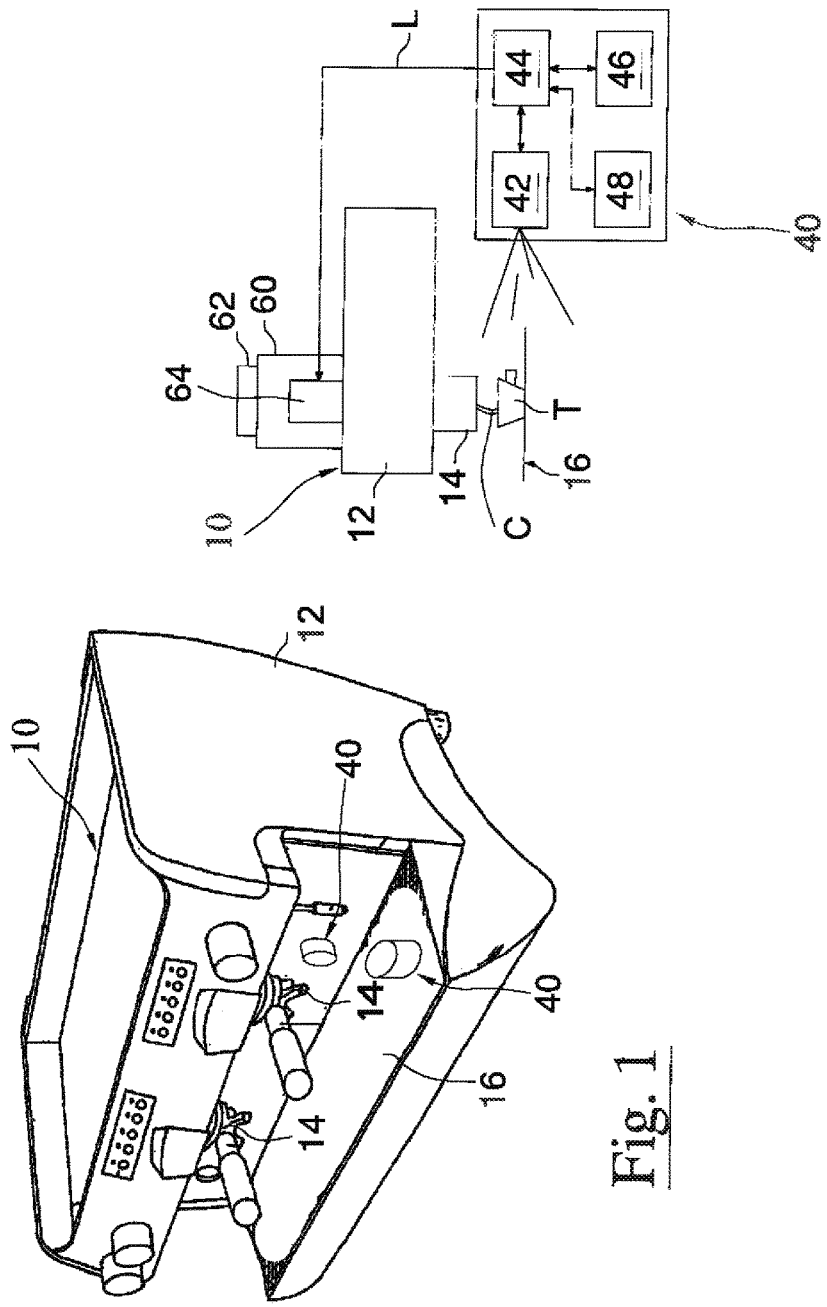

REGULATION METHOD FOR THE FINENESS OF A COFFEE GRINDER

The invention relates to a method for regulating the grinding fineness in a coffee grinder or in a coffee grinding dispenser, and to an apparatus that implements the method.

The preparation of good espresso coffee is a complex technique that requires the coincidence of many factors. One is the accurate and repeatable particle size of the ground coffee: if it is too big it will cause under-extraction (i.e. insufficient extraction) of the flavoring, if it is too thin it will cause over-extraction. Together with e.g. the precise weight of the ground coffee powder dose, the pressure and temperature of the water, the correct particle size reflects in a smooth and steady descent in the cup of the coffee (called a "mouse-tail" pour). They call "mouse tail" a thin, continuous thread of coffee, similar to honey dripping from a spoon, and with peculiar color.

A bartender must manually adjust the fineness of the coffee in the grinder in order to obtain the optimal percolation, but this needs time and experience. Where one or the other is missing, the coffee is served with sub-optimal flavor.

To help bartenders on the market there are grinders controlled by the espresso machine (Cimbali). The machine calculates the average value of the water flow rate dispensed for some espresso coffee doses. This value is stored in the machine and constitutes the ideal reference parameter thereof. Subsequently, every n espresso coffee doses, the machine calculates the average water flow rate used for dispensing and compares it to the stored ideal one. If the two values differ significantly the machine sends a signal to the grinder machine which, thanks to a motor, adjusts the distance of the grinders and thus varies the particle size. Unfortunately the particle size is regulated in an indirect way, by measuring the water flow rate, and is inaccurate. In addition, the average on the measurements generates fluctuations on the quality of the espresso coffee dispensed time after time.

To obviate to one or more of these problems is the main object of the invention, and such is the advantageous effect of what is described here and/or annexed in the claims, wherein the dependent ones define advantageous variants. In particular, another object is to improve the quality of the espresso coffee by controlling the fineness of the particle size used for the extraction of coffee.

It is proposed a method for regulating the particle size produced by a coffee grinder (e.g. by the beans) associated with an espresso coffee dispensing machine, comprising the steps of (i) acquiring, via a sensor, a data or an electrical signal indicative of the shape of the thread of liquid coffee while it percolates from the outlet of the machine (e.g. from the nozzle of a filter-holder containing the coffee powder),
(ii) driving an operator of the grinder to regulate the particle size thereof as a function of the detected signal or data.

In the following, it is understood that the invention is applicable to a grinder or a dosing-grinder, the dosage being able to take place downstream of the grinding step through different and/or separated means and/or phases.

To determine the particle size by monitoring the shape of the coffee percolation has the advantage that the regulation is practically instantaneous, at most with a delay of only one coffee. If the coffee is percolating with incorrect shape, the next percolation will be returned to the optimal because it will be generated by a modified grinding.

Another advantage is the direct measurement of the percolation, which provides a very realistic criterion to correct the grinding.

Another advantage is the accuracy and sensitivity of intervention on the grinding, because even slight fluctuations in the "mouse-tail" can be detected and the system can intervene on grinding with small adjustments. Therefore, the reference of grinding fineness is followed very precisely.

Another advantage is the absence or the high reduction of the fluctuations on coffee quality dispensed from time to time.

As an advantageous variant, in the method the electrical signal or a data indicative of the detected shape may be compared with an electrical signal or a data indicative of a reference percolation shape, and the operator may be electrically driven to adjust the fineness of the grinder as a function of the comparison result. (e.g. by proportional control: the greater the deviation, the greater the correction on the grinding). Not only the adjustment accuracy increases, but one can operate with several reference percolation shapes, e.g. by storing in a memory data relating to them and/or by selecting on preference from a memory data relating to them and on which to carry out the comparison. So one can adapt the method to various types of coffee blends and/or different types of dispensing/percolation, not only to "mouse-tail" ones.

As an advantageous variant, in the method the shape of the thread of coffee is detected by image acquisition of the percolation itself, so that e.g. the acquired electrical signal or data comes from an electrical image sensor. For the electronic image acquisition, mirrors and/or lenses for the relay/optical processing of the image may be used. As another variant, in the method the shape of the coffee thread may be detected via proximity sensors or capacitive sensors, which detect in multiple points the presence/distance of the liquid thread; or by means of temperature sensors, which by detecting at several points the temperature of the liquid thread or of its neighborhoods allow to reconstruct its shape and/or its profile. Other possibilities are to use optical sensors for the flow of coffee or infrared sensors, for picking up the flow in any light condition (even in the dark or in dim light).

As advantageous variant, from the said signal or data indicative of the shape of the thread of liquid coffee the time of percolation is calculated, thereby being able to bring/maintain it at a reference value (e.g. at 1 ml/s for a cup of 25 ml). This time can be calculated e.g. by comparing successive frames or images or data obtained from the percolation.

As an advantageous variant, since for a correct extraction the water temperature is fundamental, in the method through the acquisition from said signal or data indicative the shape of the thread of liquid coffee, the temperature of the percolating coffee is calculated, therefore such temperature may be then regulated. Obtained an estimated temperature of the percolating coffee (e.g. 64° C. to 68° C.) as a function of this value one may intervene e.g. on the particle size of the minced powder, e.g. by electrically actuating an operator of the grinder to adjust the particle size thereof. Or as a function of the estimated temperature value, the temperature of the water supplied to the coffee powder to achieve the percolation can be regulated, e.g. by sending a signal to a device of the machine in charge of the determination or control of the temperature and/or pressure of the water. E.g. the device may be:

a pressure-switch or member adapted to increase/decrease the pressure inside the boiler (thus the temperature by thermal radiation in the dispensing groups) or adapted to increase/decrease the pressure of the pump that circulates the hot percolation water, or a resistor or member placed directly in the dispensing group capable of increasing/decreasing the temperature of the group itself.

E.g. one can maintain the temperature in the upper part of the "mouse-tail" at 88-92° C. and/or the water pressure of percolation at 9 bar.

The obtaining of a data indicative also of the temperature of the percolating coffee thread is particularly easy when an infrared image of said coffee thread is acquired.

Advantageously in the method a display can be driven for communicating to the bartender the value of temperature and/or other direct or indirect data related to the percolation shape.

Another aspect of the invention is a device for regulating the grinding fineness produced by a coffee grinder (e.g. by beans) associated with an espresso coffee machine, the device comprising a sensor for generating an electrical signal or a data indicative of the shape of the thread of liquid coffee while it percolates from the outlet of a dispenser of the machine (e.g. from a nozzle of the filter holder of the machine or from the generic outlet nozzle), and a circuit for driving (e.g. electrically) an operator of the grinder to regulate the fineness of the grinder as a function of the detected signal or data.

The device may comprise means for implementing one or each steps of the method as described above, and e.g.:

a logical unit (a PC or a PLC or a microprocessor) programmed to, or an electronic circuit adapted to, compare the electrical signal or data indicative of the detected shape with an electrical signal or data indicative of a reference percolation shape, and electrically drive the operator to regulate the grinding fineness as a function of the comparison result; and/or a memory in which the unit can store reference percolation shapes and/or read them to then execute said comparison; and/or a percolation image electronic acquisition sensor and/or mirrors and/or lenses for the relay/optical image processing; and/or proximity sensors or capacitive sensors adapted to detect at several points the presence/distance of the liquid thread; and/or temperature sensors, adapted to detect the temperature at several points of the liquid thread or of its neighborhoods to reconstruct its shape and/or its profile; and/or optical sensors for the coffee flow or infrared sensors, adapted to capture the infrared radiation coming from the coffee flow; and/or the unit is programmed to, or able to calculate, also the time of percolation, and optionally to bring/keep it to a reference value, e.g. by comparing subsequent frames or images or data acquired from the percolation; and/or the unit is programmed to, or able to calculate (and therefore then potentially to regulate), the temperature of the percolating coffee, e.g. by obtaining an estimated temperature value, and as a function of this value by acting e.g. on the particle size of the grinded powder, e.g. by driving an electric operator of the grinder for adjusting the particle size thereof. Or as a function of the estimated temperature value the unit may adjust the temperature of the water supplied to the coffee powder to achieve the percolation, e.g. by sending a signal to a device of the machine in charge of the determination of the temperature and/or pressure of the water. and/or an infrared image sensor to detect said coffee thread; and/or a display to show the value of the temperature and/or other data, direct or indirect, relative to the percolation shape; and/or a user interface adapted to receive a selection input from a user and to generate a respective signal towards the logic unit, e.g. a selection input relating to the reference percolation shape.

Another aspect of the invention is the device when added or associated with a pre-existing espresso machine.

Another aspect of the invention is an espresso coffee machine comprising the device defined above.

The advantages of the invention will be more apparent from the following description of a preferred embodiment of the device for adjusting the grinding particle size of the coffee, reference being made to the attached drawing in which FIG. 1 shows a perspective view of an espresso coffee machine;

FIG. 2 shows a block diagram of a regulating device.

In the following figures, same numerals indicate same parts.

FIG. 1 shows a known espresso coffee machine 10, which comprises a frame or casing 12 in which there is a well-known support plane 16 for cups T. Vertically above the plane 16 there are arranged in known manner one or more dispensers 14 of espresso coffee, also of known type.

On the machine or in its neighborhoods there is a device 40, better described referring to FIG. 2. The device 40 can be mounted or integrated into the frame 12, e.g. by protruding from the plane 16 or from the wall behind the dispensers 14 as shown in FIG. 1.

The device 40 comprises an image sensor 42 facing a cup T placed under a dispenser 14. The sensor 42 is able to detect the shape of the coffee percolation C that falls from the dispenser 14 into a cup T.

The sensor 42 emits an electrical signal read and interpreted by a logical unit 44, for example. a PLC or a microprocessor. The unit 44 via a line L is connected to a coffee grinder 60 provided with a reservoir 62 for coffee beans. In particular, the unit 44 can drive an electromechanical grinding member or actuator 64, e.g. an electric motor, in order to control the particle size of the grinding. The member 64 is driven e.g. in known manner by an electric motor and comprises variable-distance grinders.

The unit 44 can be electrically connected with a ROM and/or RAM 46, for reading and storing data. In particular, the read data can be data indicative of one or more reference percolation shapes with which to compare the acquired signal of the actual percolation C. From the comparison, e.g. made by processing in the digital domain sample by sample or by using an analog signal, and from the difference between the actual and the ideal percolation shape C the unit 44 can adjust the grinder 60.

Operation

When the machine 10 is dispensing coffee into the cup T, the sensor 42 is active and detects the shape of the percolation C, and optionally also the output time and/or the output temperature of the water from the dispenser 14 and/or the input water pressure into the dispenser 14. The unit 44 from the sensor 42 reads the data and, on the basis of a program or by comparison with data in the memory 46, determines whether the shape is compliant to a reference (e.g. a standard of good coffee).

In the negative case, the unit 44 drives the member 64 to adjust the particle size of the coffee powder milled for the next dispensed coffee. It is clear that, once a correct program and the desired pattern for the percolation C are set in the unit 44, e.g. by storing it in the memory 46, the device 40 ensures that the coffee in the reservoir 62 is always ground with the correct particle size.

The system is open to many variants.

The image sensor 42 converts an optical image into an electrical signal. One can use e.g. digital cameras, cameras (analog too), color or black-and-white cameras, or CCD or CMOS technology sensors.

The image sensor 42 may be mounted or integrated into the machine 10, as shown in FIG. 1, or placed remotely in a separate accessory. It can be connected directly to the unit 44, through e.g. electrical tracks or connections, or through wireless channels for data transmission. The same applies to the connection between the unit 44 and the member 64.

The unit 44 is preferably programmed and operating in the digital domain, but one can use also a discrete-components circuit.

In the memory 46 the unit 44 may store various working parameters, e.g. commands to be sent to the member 64 on the basis of the signals detected by the sensor 42 and/or as a function of elaborations performed on such signals.

The device 40 can comprise a selection stage 48, or a user interface stage, such as e.g. a keyboard and/or a display. The advantage is to facilitate the programming of the unit 44, e.g. for choosing from the memory 46 the reference shape for the percolation C or working timings. The stage 48 may comprise a data input circuit, such as a USB or Bluetooth socket, to insert/receive data in/from the memory 46, e.g. programs for the unit 44 or shape templates for the percolation C.

The invention claimed is:

1. A method for regulating the particle size produced by a coffee grinder (64) associated with an espresso coffee dispensing machine (10), comprising the steps of
    acquiring, via a sensor (42), a data or an electrical signal indicative of the shape of the thread of liquid coffee (C) while it percolates from the outlet (14) of the machine, driving an operator of the grinder to regulate the particle size thereof as a function of the detected signal or data.

2. A method according to claim 1, wherein the electrical signal or a data indicative of the detected shape is compared with an electrical signal or a data indicative of a reference percolation shape, and
    the operator is driven to adjust the fineness of the grinder as a function of the comparison result.

3. A method according to claim 1, wherein a data relative to a shape of percolation is stored and/or selected by choice from a memory (46).

4. A method according to claim 1, wherein the shape of the thread of coffee is detected by image acquisition of the percolation.

5. A method according to claim 1, wherein the shape of the coffee thread is detected via proximity sensors or capacitive sensors or temperature sensors or infrared sensors or optical sensors.

6. A method according to claim 1, wherein from the said signal or data indicative of the shape of the thread of liquid coffee the time of percolation is calculated.

7. A method according to claim 1, wherein, from the said signal or data indicative the shape of the thread of liquid coffee, the temperature of the percolating coffee is calculated.

8. A method according to claim 7, wherein as a function of said calculation of the temperature and/or time of percolation, the temperature and/or time of percolation and/or the particle size is regulated.

9. A method according to claim 7, wherein as a function of said calculation of the temperature, the temperature of the water supplied to the coffee powder to achieve the percolation is regulated.

10. A method according to claim 1, wherein a display is driven for displaying the value of temperature and/or other direct or indirect data related to the percolation shape.

11. A method according to claim 1, wherein the operator is an electrically-driven electromechanical grinding member.

12. A method according to claim 11, wherein the electrically-driven electromechanical grinding member is an electric motor.

13. A device (40) for regulating the grinding fineness produced by a coffee grinder (64) associated with an espresso coffee machine (10), comprising
    a sensor (42) for generating an electrical signal or a data indicative of the shape of the thread of liquid coffee while it percolates from the outlet of a dispenser (14) of the machine, and
    a circuit (44) for driving an operator (64) of the grinder to regulate the fineness of the grinder as a function of the detected signal or data.

14. An espresso coffee machine comprising the device according to claim 13.

15. A device according to claim 13, wherein the operator is an electrically-driven electromechanical grinding member.

16. A device according to claim 15, comprising a logic unit, e.g. a microprocessor, programmed to compare the electrical signal or a data indicative of the detected shape with an electrical signal or data indicative of a reference percolation shape, and electrically drive the operator to regulate the grinding fineness as a function of the comparison result.

17. A device according to claim 16, comprising a memory in which the unit can store reference percolation shapes and/or read them to then execute said comparison.

18. A device according to claim 16, comprising a user interface adapted to receive a selection input from a user and to generate a respective signal towards the logic unit, the signal being a selection input relating to the reference percolation shape.

19. A device according to claim 13, wherein the electrically-driven electromechanical grinding member is an electric motor.

20. A device according to claim 13, comprising proximity sensors or capacitive sensors adapted to detect at several points the presence/distance of the liquid thread.

21. A device according to claim 13, comprising an infrared image sensor to detect said coffee thread.

* * * * *